No. 651,419.  
W. W. GARNER.  
THILL COUPLING.  
(Application filed May 22, 1899.)
(No Model.)
Patented June 12, 1900.
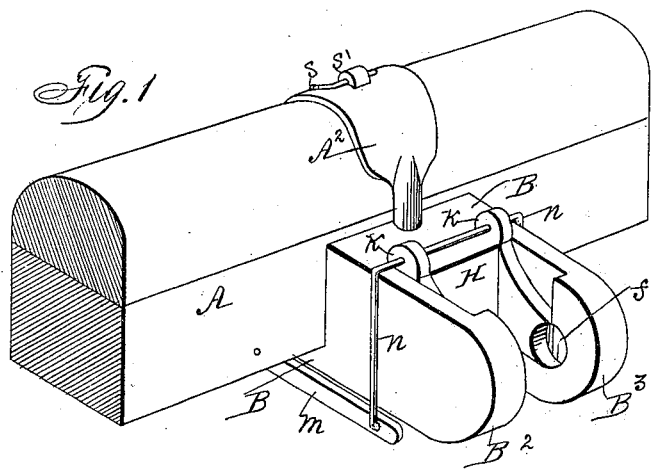
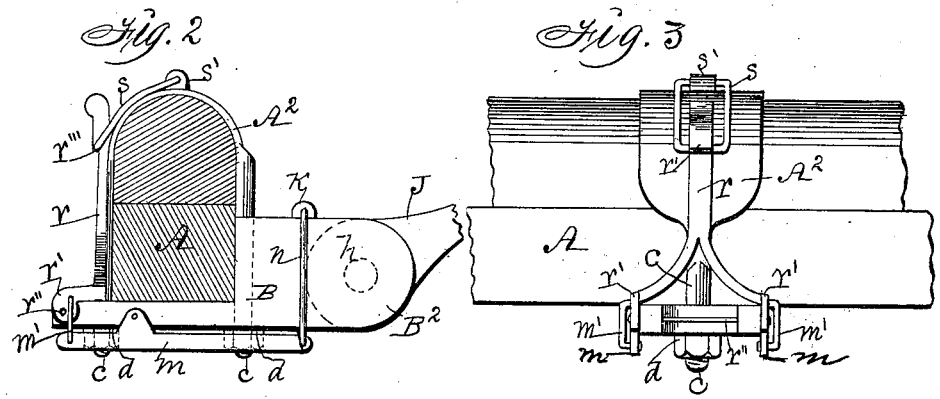
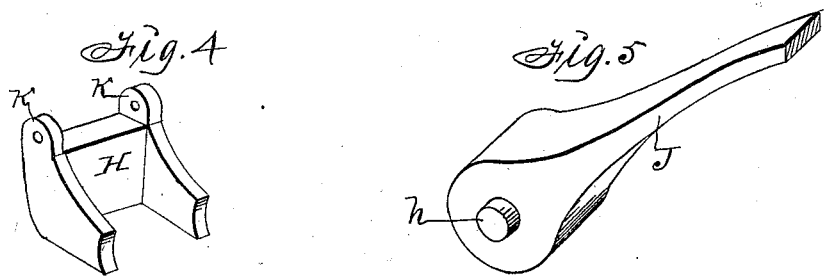
Witnesses:  
P. C. Stuart  
C. N. Jayne
Inventor:  
William W. Garner,  
By Thomas G. Orwig, Attorney.

UNITED STATES PATENT OFFICE.

WILLIAM W. GARNER, OF NEW SHARON, IOWA.

THILL-COUPLING.

SPECIFICATION forming part of Letters Patent No. 651,419, dated June 12, 1900.

Application filed May 22, 1899. Serial No. 717,691. (No model.)

*To all whom it may concern:*

Be it known that I, WILLIAM W. GARNER, a citizen of the United States, residing at New Sharon, in the county of Mahaska and State of Iowa, have invented a new and useful Thill-Coupling, of which the following is a specification.

My object is to prevent the dangers and accidents incident to shafts and poles becoming accidentally detached from the axles of vehicles on account of nuts on bolts and other fastening devices in thill-couplings getting loose or in some manner proving defective and unsafe.

My invention consists in a duplex bearer adapted to engage journals formed integral on a thill-iron and fastening devices adapted for detachably locking the duplex bearer in direct engagement with the journals and arranged and combined with an axle, as hereinafter set forth, pointed out in my claims, and illustrated in the accompanying drawings, in which—

Figure 1 is a perspective view showing my thill-coupling applied to a piece of an axle as required in practical use for detachably connecting and securely fastening thill-irons to the axle of a buggy or carriage. Fig. 2 is a transverse section of an axle and side view of the thill-coupling, showing the end of a thill-iron pivotally fastened and locked thereto. Fig. 3 is a rear view of a piece of the axle and the mechanism for locking the coupling. Fig. 4 is a perspective view of a duplex bearing adapted to engage the journals of a thill-iron and to be detachably fastened between the parallel mating parts of the main portion of the coupling. Fig. 5 is a perspective view of the rear end portion of a thill-iron adapted to be detachably connected with the coupling.

The letter A designates a vehicle-axle of common form.

B is the front end portion of the main part of my coupling-iron fitted to the front face of the axle and also to the under side of the axle and fixed to the axle by means of a U-shaped clip $A^2$, that has screw-threaded ends $c$ extended down through vertical bores in the part B and nuts $d$ placed thereon, as shown in Figs. 2 and 3.

$B^2$ and $B^3$ are mating parallel forward extensions of the part B, provided with recesses in their inside faces and journal-bearings $f$, intersecting the recesses, as shown in Fig. 1.

H is a duplex bearing in the form of a three-sided frame fitted in size and shape to enter the recesses in the mating parts $B^2$ and $B^3$ and in combination with the bearings $f$ produce complete separable journal-bearings, as required to admit the journals $h$ on the sides of the thill-iron J. (Shown in Fig. 5.) Perforated integral lugs $k$ on the top corners of the duplex bearer H serve as a means of pivotally connecting locking mechanism therewith.

Mating parallel straight bars $m$ are pivotally connected with the sides of the extension of the main part B under the axle, as shown in Fig. 2, and pivotally connected with a wire frame $n$, that is hinged to the lugs $k$ of the duplex bearer H, as shown in Figs. 1 and 2. A lever $r$, having elbow-shaped forks $r'$ at its lower end pivoted to the rear corners of the extension of the main part B by means of a pin $r''$, is provided with a shoulder $r'''$ near its top and adjustably connected with the rear ends of the bars $m$ by means of links $m'$, as shown in Figs. 2 and 3.

$s$ is a loop pivotally connected with a lug $s'$ on the top of the clip $A^2$ in such a manner that it will engage the shoulder $r'''$ of the lever $r$ as required to retain the lever in a vertical position and the coupling mechanism locked as required to securely connect thill-irons J with the mating parts $B^2$ and $B^3$ of the coupling. To unlock the coupling, I simply release the top end of the lever $r$ from the loop $s$, so that the lever end bars $m$ can be readily adjusted as required for lifting the duplex bearer H, so as to allow the journals $h$ of the thill-iron J to be lifted out of the bearings $f$.

I am aware that caps or covers have been hinged to a clip to overlay the journals of a thill-iron in such a manner that their front ends could be lifted while their rear ends remained fastened; but my manner of forming recesses and intersecting journal-bearings in the inside faces of the mating parts that project forward from a clip and fitting duplex bearers in said recesses to engage the journals is greatly advantageous in that the front parts of the bearers extend partly under the journals of the thill-iron and cannot be lifted until the rear portion of the duplex bearer is unlocked and lifted, so that it is impossible to accidentally disconnect the thill-iron from the clip as long as the rear end of the duplex bearer is locked.

From the foregoing description of the construction and function of each part the practical operation and utility of my invention will be readily understood by persons familiar with the art to which it pertains, and What I therefore claim as new, and desire to secure by Letters Patent, is—

1. In a thill-coupling, a clip having mating forward projections, recesses in the inside faces of the projections, journal-bearings intersecting said recesses and a duplex bearer fitted in said recesses to extend partially under the journals of a thill-iron and means for detachably fastening the duplex bearer to operate in the manner set forth for the purposes stated.

2. The duplex bearer H, having perforated lugs $k$, in combination with a coupling-iron B having mating parts $B^2$ and $B^3$ provided with recesses in their inside faces and journal-bearings $f$ intersecting the said recesses, and means for detachably fastening the said duplex bearer, for the purposes stated.

3. A thill-coupling comprising a coupling-iron fitted to the front and bottom of an axle, a clip fitted over the axle and provided with screw-threaded ends extended through bores in the coupling-iron and nuts on their ends, mating parallel bearers on the front of the coupling-iron provided with recesses on their inside faces and journal-bearings intersecting said recesses, a duplex journal-bearing fitted in said recesses, a lever having elbow-shaped forks at its lower end and a shoulder at its top portion pivoted to the rear end of the coupling-iron, mating straight bars pivoted to the sides of the coupling-iron and connected with the elbow-shaped forks of the lever at their rear ends and with the duplex bearer at their front ends, to operate in the manner set forth for the purposes stated.

4. The thill-coupling consisting of the coupling-iron B having mating parts $B^2$ and $B^3$ provided with recesses in their inside faces and journal-bearings $f$ intersecting said recesses, a clip $A^2$ having screw-threaded ends $c$ extended through bores in the coupling-iron and secured thereto by nuts $d$, a duplex bearing H, having perforated lugs $k$, a lever $r$ having elbow-shaped forks $r'$ at its lower end and a shoulder $r''$ at its top portion pivoted to the rear end of the coupling-iron, a loop $s$ pivoted to the top of the clip, two mating bars $m$ pivoted to the sides of the coupling-iron and connected with the forks of the lever by links $m'$ and connected with the duplex bearer by a frame $n$ and a thill-iron J having journals $h$, all arranged and combined as shown and described.

WILLIAM W. GARNER.

Witnesses:
R. H. ORWIG,
THOMAS G. ORWIG.